(12) United States Patent
Bailey et al.

(10) Patent No.: US 6,293,699 B1
(45) Date of Patent: Sep. 25, 2001

(54) METHOD OF CONTINUOUSLY MONITORING CONTROLLED TEMPERATURE UNITS

(75) Inventors: Fred J. Bailey, Hatfield; Mark Pinder, Phoenixville; Carl W. Holz, Perkasie, all of PA (US)

(73) Assignee: Merck & Co., Inc., Rahway, NJ (US)

( * ) Notice: Subject to any disclaimer, the term of this patent is extended or adjusted under 35 U.S.C. 154(b) by 0 days.

(21) Appl. No.: 09/426,995

(22) Filed: Oct. 26, 1999

Related U.S. Application Data
(60) Provisional application No. 60/105,670, filed on Oct. 26, 1998.

(51) Int. Cl.⁷ .............................. G01K 7/00; G01K 7/16
(52) U.S. Cl. ...................... 374/166; 374/185; 340/870.17
(58) Field of Search .................................. 374/166, 185, 374/183; 340/870.17

(56) References Cited

U.S. PATENT DOCUMENTS

| | | | | |
|---|---|---|---|---|
| 2,135,078 | * | 11/1938 | Hubbard et al. ...................... | 374/186 |
| 3,594,752 | * | 7/1971 | Alton .................................. | 374/166 |
| 3,606,792 | * | 9/1971 | Yoshimoto .......................... | 374/166 |
| 4,060,377 | * | 11/1977 | Hentz et al. ........................ | 374/185 |
| 4,449,035 | * | 5/1984 | Schwob ............................... | 374/185 |
| 4,510,343 | | 4/1985 | Sivyer . | |
| 4,776,705 | | 10/1988 | Najjar et al. . | |
| 4,778,538 | * | 10/1988 | Lyman ............................... | 374/208 |
| 4,955,980 | * | 9/1990 | Masuo ................................ | 374/185 |
| 4,968,152 | * | 11/1990 | Bergmann .......................... | 374/147 |
| 5,449,234 | * | 9/1995 | Gipp et al. ......................... | 374/185 |
| 5,720,556 | * | 2/1998 | Krellner ............................. | 374/185 |
| 5,812,588 | * | 9/1998 | Deak et al. ........................ | 374/166 |
| 5,969,639 | * | 10/1999 | Lauf et al. ..................... | 340/870.17 |

FOREIGN PATENT DOCUMENTS

| | | | | |
|---|---|---|---|---|
| 278102 | * | 8/1998 | (EP) ................................. | 374/166 |
| 55-039006 | * | 3/1980 | (JP) .................................. | 374/185 |
| 59-026025 | * | 2/1984 | (JP) .................................. | 374/166 |

OTHER PUBLICATIONS

Noel Fenton, "Remote Temperature Measurements", Instruments and Control Systems, vol. 43, No. 6, pp. 96–97, Jun. 1970.*

* cited by examiner

Primary Examiner—Diego Gutierrez
Assistant Examiner—Stanley J. Pruchnic, Jr.
(74) Attorney, Agent, or Firm—James M. Hunter, Jr.; Mark R. Daniel

(57) ABSTRACT

There is disclosed a method for continuously monitoring temperature at multiple locations within a controlled temperature unit (CTU) using RTDs that can be removed and reinserted. The key to the method is the collection of data using an RTD fixed in a phenolic thermowell, which in turn is inserted through a polytetrafluoroethylene-coated sleeve in the wall of the CTU. The temperature information is transmitted from a data module to an interfaced computer system where it may be presented to the operator in a graphical, tabular or text format or stored in memory. The temperature probes are easily removable so as to facilitate calibration without disruption of the contents of the CTU and can be consistently replaced in the same location within the CTU.

14 Claims, 3 Drawing Sheets

D01 – UPPER LEFT FRONT CORNER
D02 – UPPER RIGHT BACK CORNER
D03 – LOWER LEFT BACK CORNER
D04 – LOWER RIGHT FRONT CORNER
D05 – MIDDLE CENTER BACK OF UNIT
D06 – *CLOSE TO CONTROLLING PROBE

METHOD OF CONTINUOUSLY MONITORING CONTROLLED TEMPERATURE UNITS

This application claims benefit of Prov. No. 60/105,670 filed Oct. 26, 1998.

BACKGROUND OF THE INVENTION

This invention relates to a method for continuously monitoring temperatures at multiple locations within a controlled temperature unit (CTU). The instant invention provides the advantage that the temperature probes used to acquire the data may be easily removed for good manufacturing practice (GMP) compliant calibration, and most importantly without disturbing the contents of the CTU.

CTUs are employed in a variety of applications. They are routinely used in stability studies as a part of drug development and manufacturing programs as well as storage of GMP raw materials, retain samples and bulk intermediates. Central to such programs is adherence to GMP requirements, which present an industry standard for manufacture. Compliance to good manufacturing practices requires regular calibration of CTUs to ensure proper operation of the unit.

Continuously monitored CTUs typically measure temperature by means of a thermocouple or RTD (Resistive Temperature Device). However, there is no commercially available CTU design which incorporates removable temperature sensor wiring or a thermocouple unit in order to provide both continuous acquisition and output of the data in a format able to be manipulated by computer software. The few CTUs that do have devices that output data to a computer are not able to be externally calibrated without disturbing the contents of the CTU or are only equipped to monitor a single heating or freezing element and not multiple locations within the CTU over the course of long term storage of samples. None of these CTUs has a removable RTD assembly to permit easy calibration. U.S. Pat. No. 4,776,705, discloses a device that permits the determination of temperature in hostile environments such as a high-temperature reactor. This device utilizes a removable thermocouple, however, the apparatus primarily addresses the problem of breakdown of the wires of the thermocouple due to interaction with the products of combustion of carbonaceous fuel. Similarly, U.S. Pat. No. 4,510,343 discloses a device to be used in petroleum cracking furnaces.

Both of these prior art devices are manufactured using a refractory material, typically a metal or ceramic, and neither of these devices has been employed in subfreezing conditions. These refractory materials maintain their integrity under high heats, but under freezing conditions, devices employing this construction run the risk of having the interior RTD freeze in place thereby effectively becoming irremovable. These devices have the potential for moisture accumulation as a result of incident air condensing on the RTD when it is removed from its seated position, resulting in freezing inside the thermowell.

In order to circumvent this problem, workers in the industry have resorted to inserting thermocouple wiring through the door gasket of a CTU requiring continuous observation. However, these wires must be removed from the CTU in order to calibrate them. Even careful removal of the wires, can lead to disruption of the contents of the CTU which, in addition to general inconvenience, may be fatal to long term stability studies requiring undisturbed incubation of samples for long periods of time. Replacement of the wires in identical locations is also difficult, and therefore a long-term assessment of temperature variation from a given probe is virtually impossible. The present invention solves this industry-wide problem.

Thus, the primary object of the instant invention is to provide a method for continuously monitoring temperature wherein the RTDs used in data acquisition may be easily removed for calibration without disturbing the contents of the CTU.

SUMMARY OF THE INVENTION

There is disclosed a method for continuously monitoring a CTU using an apparatus that is easily removable for calibration, without disturbing the contents of the CTU. The invention overcomes the problems of inconsistent replacement of the probe wires and load disruption. The method comprises the placement of polytetrafluoroethylene (PTFE)-coated sleeves into holes piercing the thickness of the walls of the CTU at minimally six different points per 1200 cubic feet of CTU volume. RTDs are then inserted into the sleeves. The RTDs are functionally attached to data collection means such as the module produced commercially by Keithley Corporation under the trade name SMARTLINK™. The data module is functionally attached to an ethernet port using a standard interface cable which allows temperature data to be transmitted over a network to data acquisition means, such as a desktop or laptop computer. Data analysis software installed on the data acquisition means permits the operator to manipulate the data and store it or output it in a graphical, tabular or text format. The semi-permanent placement of the RTDs permits their easy removal from the PTFE-coated sleeves for calibration purposes and permits them to be reliably replaced in the same positions in order to impart overall uniformity to the data acquired, and the ability to collect long-term temperature data from consistent locations within the CTU.

The instant invention will be more fully understood in the following detailed description, it being understood, however, that the invention is not confined to the precise disclosure. Changes and modification may be made that do not affect the spirit of the invention, nor exceed the scope thereof, as expressed in the appended claims. Accordingly, the instant invention will now be described with particular reference to the accompanying drawings.

DETAILED DESCRIPTION OF THE INVENTION

There is disclosed a method for continuously monitoring the temperature within a CTU using removable resistive temperature devices (RTDs) which comprises employing a CTU equipped with one or more removable RTDs functionally connected to data collection means which transmit said collected data to data acquisition means for analysis. As part of the invention, the RTDs are located within a phenolic thermowell located within a PTFE-coated sleeve extending through the entire thickness of the insulation of the CTU wall. The RTDs can be removed from the thermowells at operator determined time intervals for calibration using standard calibration means. Following calibration, the RTDs are replaced into the corresponding thermowells in order to resume the continuous temperature monitoring and data collection.

The data received at the data collected from each of the RTDs connected to the data collection means is then transmitted over an ethernet or other type of link over the computer network to data acquisition means. The data acquisition means uses applicable software to output the collected temperature data in graphical or tabular form, or any other form required by the operator. The data acquires can be stored in a permanent or semi-permanent memory means.

Continuous monitoring using RTDs that are inserted through the sidewall of the CTU are easily removable for calibration or maintenance without opening the CTU or disturbing the interior contents.

Figure 1:
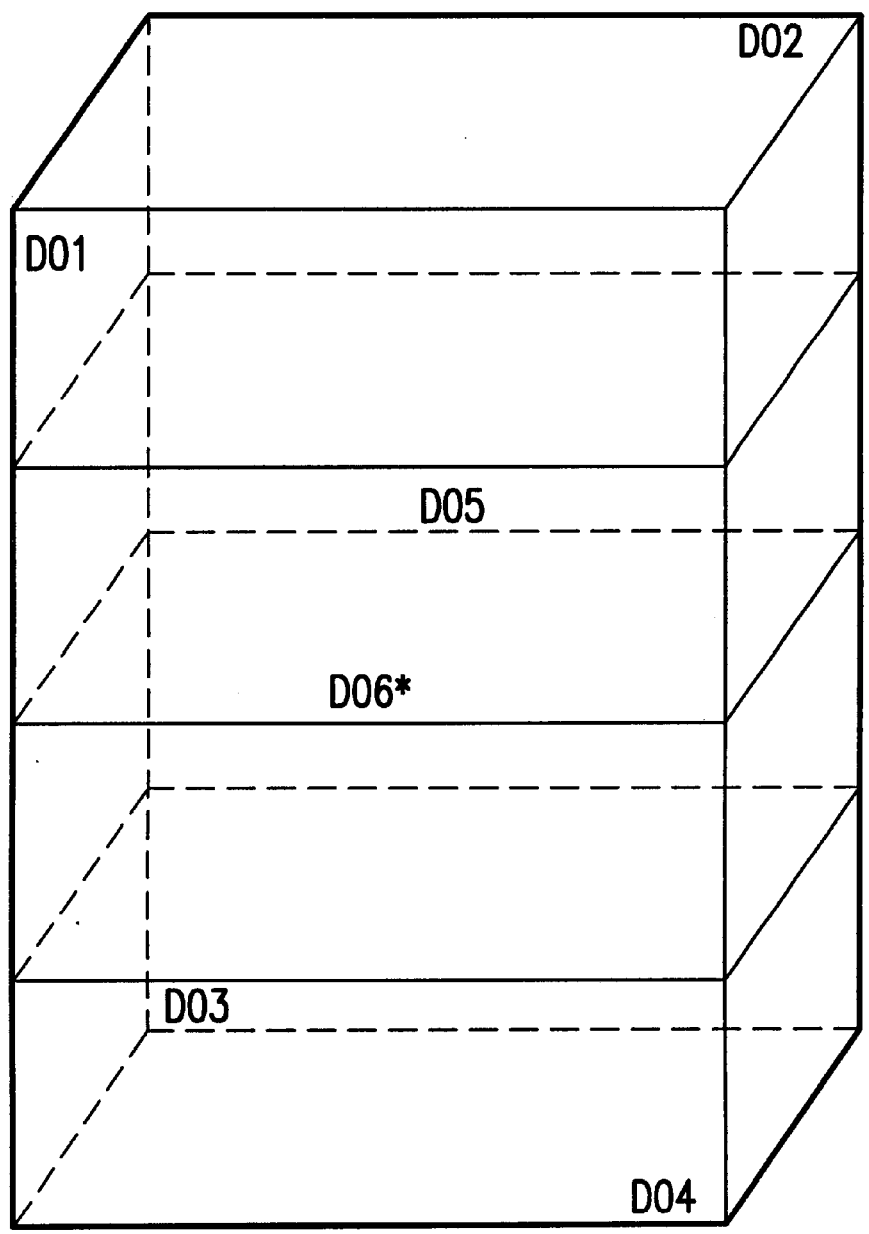
FIG. 1 shows the placement of six probes in a 1200 cubic foot CTU.

With reference to the drawings, FIG. 1 shows the placement of a number of RTDs in a CTU. The CTU may be either an oven, incubator, refrigerator, freezer or any other type of CTU. At least six probes are inserted per 1200 cubic feet of volume. The figure discloses the preferred placement scheme of six RTDs so as to allow continual global monitoring of the CTUs interior temperature. Each RTD is assigned a unique identifier so as to make it possible to monitor temperature change on a probe-by-probe basis as well on a global basis.

Figure 2:
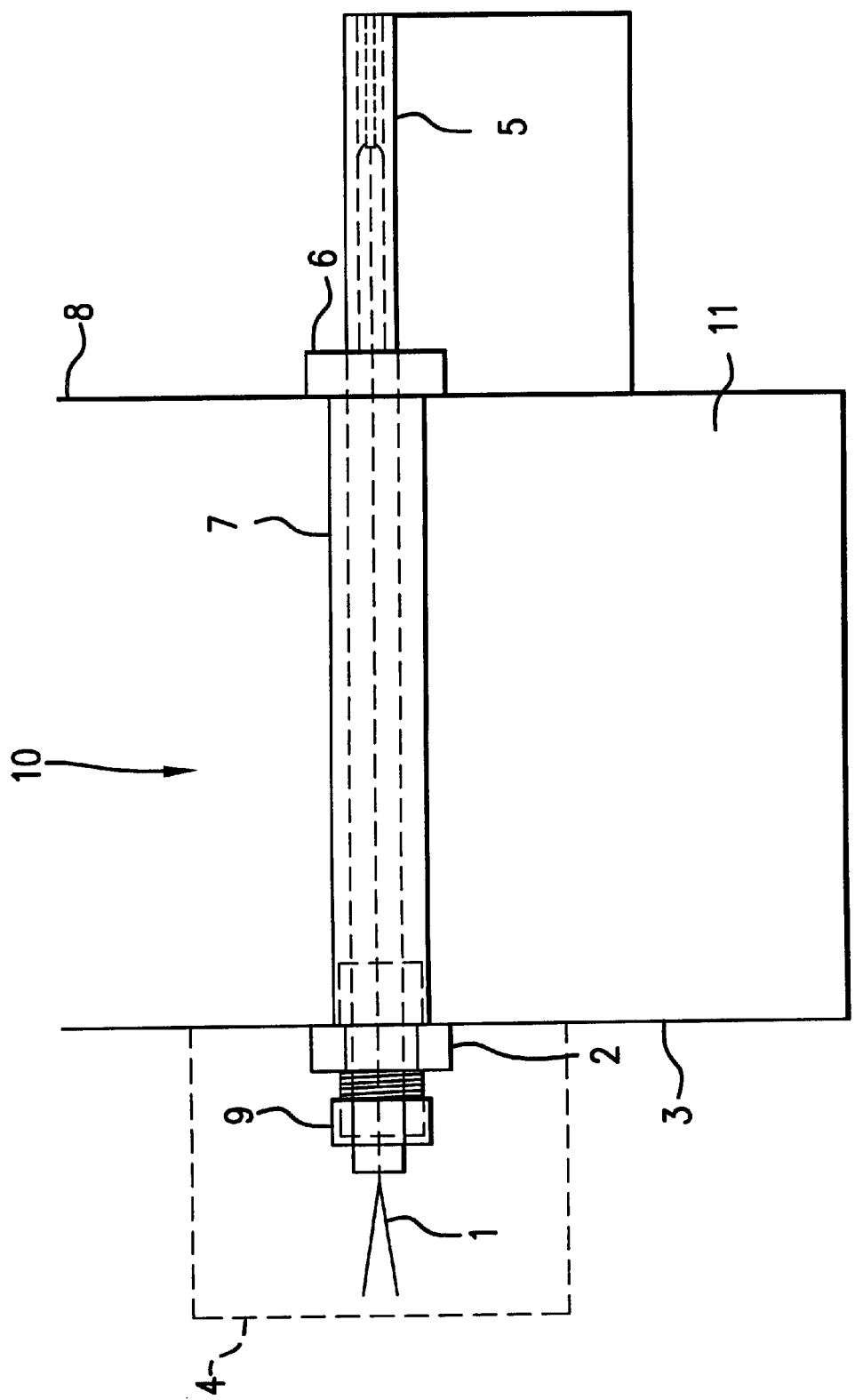
FIG. 2 shows a side view of the cabinet wall of a CTU and depicts the orientation and position of the thermowell and removable temperature probe.

FIG. 2 shows a side view of the wall 10 of a CTU. Indicated in the figure are the phenolic thermowell 5, which extends into the interior of the CTU. The RTD wires are also indicated 1 and are fixed within the thermowell by means of a sealing compound. The thermowell is constructed of a phenolic composition so as to resist degradation and corrosion in hostile environments. The thermowell is inserted into a PTFE-coated sleeve 7 which extends through the wall of the CTU. The sleeve is oriented parallel to the top and bottom of the CTU and serves to guide the phenolic thermowell through the insulation 11 of the CTU. The thermowell is secured to the interior wall 8 of the CTU by means of a polytetrafluoroethylene coupling 6. The thermowell is secured on the exterior face 3 of the CTU by another coupling 2, similar to the interior coupling but machined of PTFE. In a preferred embodiment, the coupling is machined to be ⅜" compression by ⅜ national pipe thread (NPT). The sleeve is fixed within the wall of the CTU. The RTD, in a preferred embodiment, is inserted into the sleeve as shown in the figure and fixed in place by means of a stainless steel compression nut 9. The portion of the assembly exposed on the exterior surface of the CTU is enclosed within a protective plastic housing 4. The RTD leads are functionally attached to a data module, to which temperature data is continually transmitted from the RTDs. The data module is functionally attached to an ethernet network card, which allows transfer of temperature data to a data acquisition station, at which an operator may manipulate and store the incoming data as required.

Figure 3:
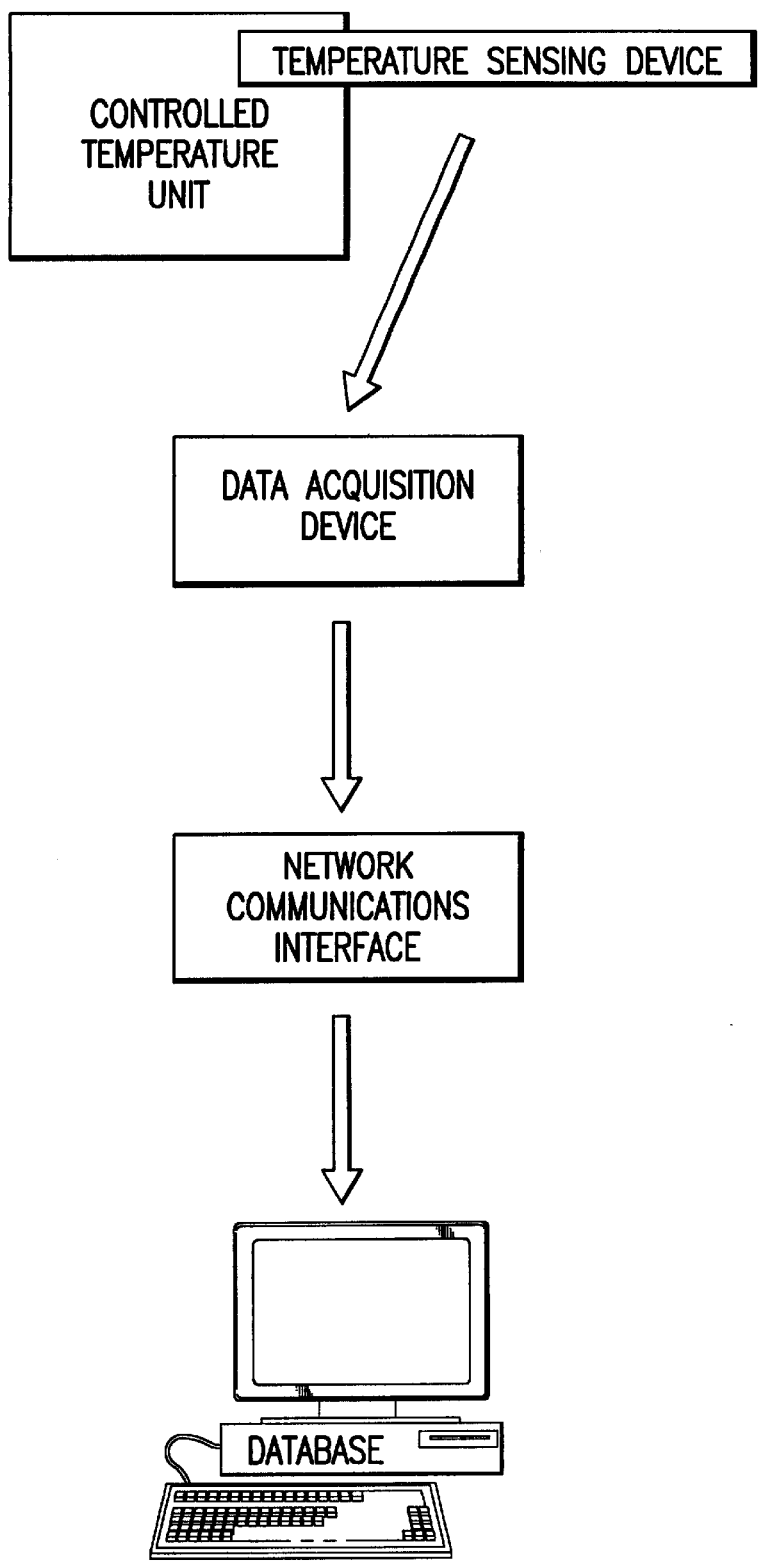
FIG. 3. shows a block diagram describing the layout of the required equipment.

FIG. 3 shows a block diagram illustrating each component of the system. The arrows demonstrate the direction of data transfer and communication between each component.

The key to the instant invention is the fact that the RTDs are removable from the PTFE-coated sleeve simply by releasing the compression nut. Release of the compression nut allows the operator to easily slide the RTD out of the sleeve and periodically perform required calibration operations without disturbing the load of the CTU which minimizes interference with ongoing stability studies or other types of controlled temperature operations. It also allows for consistent reinsertion of the RTDs thus preventing RTDs from being inserted into the wrong sleeve.

The principle, preferred embodiment and mode of operation of the present invention have been described in the foregoing specification. However, the invention which is intended to be protected is not to be construed as limited to the particular embodiments disclosed. The embodiment is to be construed as illustrative rather than restrictive. It is recognized, however, that departures may be made there from within the scope of the invention, and that obvious modifications may occur to a person skilled in the art, and that the metes and bounds of the invention are to determined solely from the appended claims.

What is claimed is:

1. A method for continuously monitoring the temperature within a controlled temperature unit (CTU) using removable resistive temperature devices (RTDs) which comprises employing a CTU equipped with one or more removable RTDs functionally connected to data collection means which transmit said collected data to data acquisition means for analysis, wherein the RTDs are located within a phenolic thermowell located within a polytetrafluoroethylene-coated sleeve extending through the entire thickness of the insulation of the CTU wall.

2. The method of claim 1 wherein the RTDs are removed from the thermowells at operator determined time intervals for calibration using standard calibration means.

3. The method of claim 2 wherein the RTDs are replaced into the thermowells following calibration in order to resume the continuous temperature monitoring.

4. The method of claim 1 wherein the RTDs are removed from the thermowells at operator determined time intervals for maintenance.

5. The method of claim 1 wherein the data received at the data acquisition means is outputted in graphical or tabular form.

6. The method of claim 5 wherein the data is stored in a permanent or semi-permanent memory means.

7. A method for continuously monitoring the temperature within a controlled temperature unit (CTU) using removable resistive temperature devices (RTDs) which comprises employing a CTU equipped with one or more removable RTDs functionally connected to data collection means which transmit said collected data to data acquisition means for analysis, wherein the RTDs are removed from the thermowells at operator determined time intervals for calibration using standard calibration means, and wherein the RTDs are located within a phenolic thermowell located within a polytetrafluoroethylene-coated sleeve extending through the entire thickness of the insulation of the CTU wall.

8. The method of claim 7, wherein the RTDs are removed from the thermowells at operator determined time intervals for maintenance.

9. The method of claim 8, wherein the data received at the data acquisition means is outputted in graphical or tabular form.

10. The method of claim 9, wherein the RTDs are replaced into the thermowells following calibration in order to resume the continuous temperature monitoring.

11. The method of claim 10, wherein the data is stored in a permanent or semi-permanent memory means.

12. A method for continuously monitoring the temperature within a controlled temperature unit (CTU) using removable resistive temperature devices (RTDs) which comprises employing a CTU equipped with one or more removable RTDs functionally connected to data collection means which transmit said collected data to data acquisition output in graphical or tabular form for analysis, wherein the RTDs are removed from the thermowells at operator determined time intervals for calibration using standard calibration means and are replaced into the thermowells following calibration in order to resume the continuous temperature monitoring, and wherein the RTDs are located within a phenolic thermowell located within a polytetrafluoroethylene-coated sleeve extending through the entire thickness of the insulation of the CTU wall.

13. The method of claim 12, wherein the RTDs are removed from the thermowells at operator determined time intervals for maintenance.

14. The method of claim 13, wherein the data is stored in a permanent or semi-permanent memory means.

* * * * *